Patented Dec. 17, 1946

2,412,762

UNITED STATES PATENT OFFICE 2,412,762

MANUFACTURE OF BUTADIENE FROM PROPENE AND FORMALDEHYDE

Arnold R. Workman, Malverne, N. Y., assignor to Cities Service Oil Company, New York, N. Y., a corporation of Pennsylvania No Drawing. Application December 17, 1942, Serial No. 469,359

6 Claims. (Cl. 260—681)

This invention relates to the manufacture of butadiene which is now of considerable importance as a raw material in the manufacture of synthetic rubbers. More particularly, the invention relates to the manufacture of butadiene from propene and formaldehyde.

Butadiene is now manufactured on a large scale directly from $C_4$ hydrocarbons by various procedures, most of which involve the dehydrogenation of normal butane or straight chain butenes. These processes are very expensive to operate and involve the use of the elaborate equipment including auxiliary facilities such as the production and use of the superheated steam at temperatures approaching 1200° F. Many processes for the manufacture of butadiene from other compounds have been developed such for example as the dehydration of 1,3-butene glycol.

The primary object of the present invention is to provide an improved method for the manufacture of the butadiene from relatively inexpensive propene and formaldehyde.

The use of propene in the manufacture of highly desirable butadiene does not interfere with the petroleum industry's program of manufacturing motor fuels and butadiene from hydrocarbons because it is not a constituent of the raw materials used for the making of these products, whereas the butane and the butenes are important constituents of practically all gasolines.

The process of the present invention is one in which propene and formaldehyde are condensed under substantially anhydrous conditions and coverted to butadiene in a single or a two-stage operation, as distinguished from the procedure disclosed by Fitzky Patent No. 2,143,370.

According to the preferred embodiment of the process, dry propene and dry formaldehyde are mixed in the desired proportions and contacted with a condensation catalyst at a temperature of about 35° F., to effect a C-C linkage between a molecule of propene and a molecule of formaldehyde, so that the formaldehyde carbon is attached to the terminal unsaturated carbon of the propene. Simultaneously or thereafter, the resulting reaction products which preferably includes an excess of propene, are contacted with a catalytic material adapted to effect a complex dehydration of the condensed propene and formaldehyde molecules, thus producing 1,3-butadiene. The preferred condensation catalyst is $HBF_4$, a volatile combination of HF and $BF_3$ (boron fluoride). Other catalysts may be used, as pointed out hereinafter. The catalyst used for removing water from the condensation product is preferably an anhydrous material such as zirconium dioxide, magnesium sulfate, cupric phosphate, aluminum phosphate or phosphorus pentoxide. The proportions of catalytical materials employed may be varied in accordance with the operating conditions, such as the temperature and pressure selected for a particular operation. In general, from 0.5% to 3% of the condensation catalyst is sufficient.

The process of the present invention may be more specifically illustrated by reference to the following examples:

Example 1

A mixture of propene and formaldehyde in the ratio of two moles of propene to one mol of formaldehyde containing 1.5% of $HBF_4$ as a catalyst is conducted as a vapor at a pressure of about 100 lbs. per square inch through a tubular heater maintained at a temperature of about 85° F. The mixture is heated at this temperature for approximately two minutes, after which it is mixed with approximately 2% of zirconium dioxide, $ZrO_2$, and conducted through a second tubular heater in which it is heated for approximately five minutes at a temperature of about 175° F. and a pressure of about 10 lbs. per square inch gage.

The resulting reaction mixture is passed through a cooler and separator to remove the solid catalytic material, and then chilled down to a temperature of from 15° to 20° F. to condense the butadiene from any gases which may remain. The mixture is then fractionated to recover a condensate containing practically all the butadiene. Approximately 80% of the formaldehyde combines with propene to produce 1,3-butadiene.

Example 2

A mixture of propene and formaldehyde in the ratio of 3 mols of propene to 1 mol of formaldehyde is conducted through a tall chamber heated to a temperature of about 115° F. and packed with a carrier material impregnated with a mixed catalyst containing cuprous chloride and cupric phosphate. A pressure of 50 lbs. gage is maintained in the chamber. The mixture of propene and formaldehyde as a substantially anhydrous vapor, is conducted through the catalyst chamber at a rate sufficient to give a reaction time of approximately three minutes. The reaction products including the 1,3-butadiene are cooled to a temperature of about 25° F. and passed in contact with furfural which selectively extracts the butadiene.

The above examples are given by way of illustration of the invention and are not intended to limit the invention to the specific catalysts mentioned or to the specific conditions. Other condensing catalysts may be used such as boron halides either alone or in conjunction with HF. The cupric and cuprous halides may be used and also zirconium, silver and beryllium halides. Mixtures of any of these materials may be used such as silver and cuprous chlorides. In some cases the condensation catalyst will also give considerable butadiene directly but small proportions of dehydration catalysts are preferably employed either along with the condensation catalyst or in series therewith. ZrOCl₂ is a good combination catalyst. A suitable catalyst mixture may include zirconium chloride and zirconium dioxide. Where solid catalysts are used such as in Example 2, they may be combined or held in separate chambers or zones kept at different temperatures, or they may be suspended in the vapor mixture of the propene and formaldehyde, at the same time or in series. A suspended condensation catalyst may be separated from the vapors before contacting them with the dehydration catalyst.

The exact nature of the reactions involved in the formation of the 1,3-butadiene is not definitely understood but one theory which may account for the formation of the butadiene is that one of the bonds between the oxygen and carbon of the formaldehyde is broken, along with one of the bonds of the double bond of the propene, so that the C of the formaldehyde is attached to the terminal C of the propene while the oxygen takes a hydrogen each from the terminal carbons of the propene and splits off. These reactions may or may not include an intermediate stage in which the freed bond of the oxygen is temporarily attached to the middle carbon of the propene, the oxygen later taking the hydrogens from the terminal carbons of the original propene group under the influence of the dehydration catalyst.

Some 1,2-butadiene may be formed as an intermediate product in the condensation operation, but it is easily isomerized to 1,3-butadiene under the influence of the dehydration catalyst. An excess of propene is preferably used in order to quickly use up the available formaldehyde and avoid the possible condensation of formaldehyde molecules. However, the process may be carried out with equimolar proportions of propene and formaldehyde. Some small quantities of propene polymers may be formed in the operation but such materials are readily separable from the butadiene by fractional distillation, or by fractional distillation and extraction with selective solvents such as furfural or the complex copper ammonium acetate which has a selective affinity for butadiene.

The condensation reaction of the process is preferably carried out at a temperature of from about 75° F. to about 115° F., while the dehydration temperature may range from 100° F. to 250° F., depending on the catalysts used and the length of the reaction time selected. When the process is carried out by contacting the propene and formaldehyde in series with the two types of catalysts, the first part of the reaction is preferably conducted at a relatively high pressure of from 50 to 275 lbs. per square inch, whereas the second part of the reaction is preferably conducted at a relatively low pressure of from atmospheric to about 10 lbs. gage. The proportion of dehydration catalyst may vary from 0.5% to 2.5%.

From the foregoing description of the process, it will be apparent that various modifications may be made in the operation and at the same time effect the conversion of propene and formaldehyde into 1,3-butadiene.

Having described the invention in its preferred form, what is claimed as new is:

1. A process for the manufacture of butadiene, which comprises reacting propene with formaldehyde under substantially anhydrous conditions at a temperature of from 75° to 115° F. in contact with a catalyst mixture including zirconium chloride and zirconium dioxide.

2. In a process for the manufacture of butadiene, the improvement which comprises reacting propene with a formaldehyde under substantially anhydrous conditions and at a temperature of from 75° to 115° F. in contact with a zirconium chloride condensation catalyst to effect the condensation of the propene with the formaldehyde, and converting the resulting condensation product to butadiene by contacting it with a dehydration catalyst adapted to split off water from the condensation product.

3. In a process for the manufacture of butadiene, the improvement which comprises reacting propene with a formaldehyde under substantially anhydrous conditions and at a temperature of from 75° to 115° F. in contact with a zirconium chloride condensation catalyst adapted to effect the condensation of the propene with the formaldehyde, and converting the resulting condensation product to butadiene by contacting it with a zirconium dioxide dehydration catalyst adapted to split off water from the condensation product.

4. In a process for the manufacture of butadiene, the improvement which comprises reacting propene with a formaldehyde under substantially anhydrous conditions at a temperature of from 75° to 115° F. and at a pressure of from 50 to 275 lbs. per square inch in contact with a zirconium chloride condensation catalyst to effect the condensation of the propene with the formaldehyde, and converting the resulting condensation product to butadiene by contacting it at approximately atmospheric pressure with a dehydration catalyst adapted to split off water from the condensation product.

5. In a process for the manufacture of butadiene, the improvement which comprises reacting propene with a formaldehyde under substantially anhydrous conditions at a temperature of from 75° to 115° F. and at a pressure of from 50 to 275 lbs. per square inch in contact with a zirconium chloride condensation catalyst to effect the condensation of the propene with the formaldehyde, and converting the resulting condensation product to butadiene by contacting it at a temperature of from 100° to 250° F. with a dehydration catalyst adapted to split off water from the condensation product.

6. In a process for the manufacture of butadiene, the improvement which comprises reacting propene with a formaldehyde under substantially anhydrous conditions at a temperature of from 75° to 115° F. in contact with a condensation and dehydration catalyst comprising ZrOCl₂, and recovering the resulting butadiene.

ARNOLD R. WORKMAN.